Patented Aug. 14, 1945

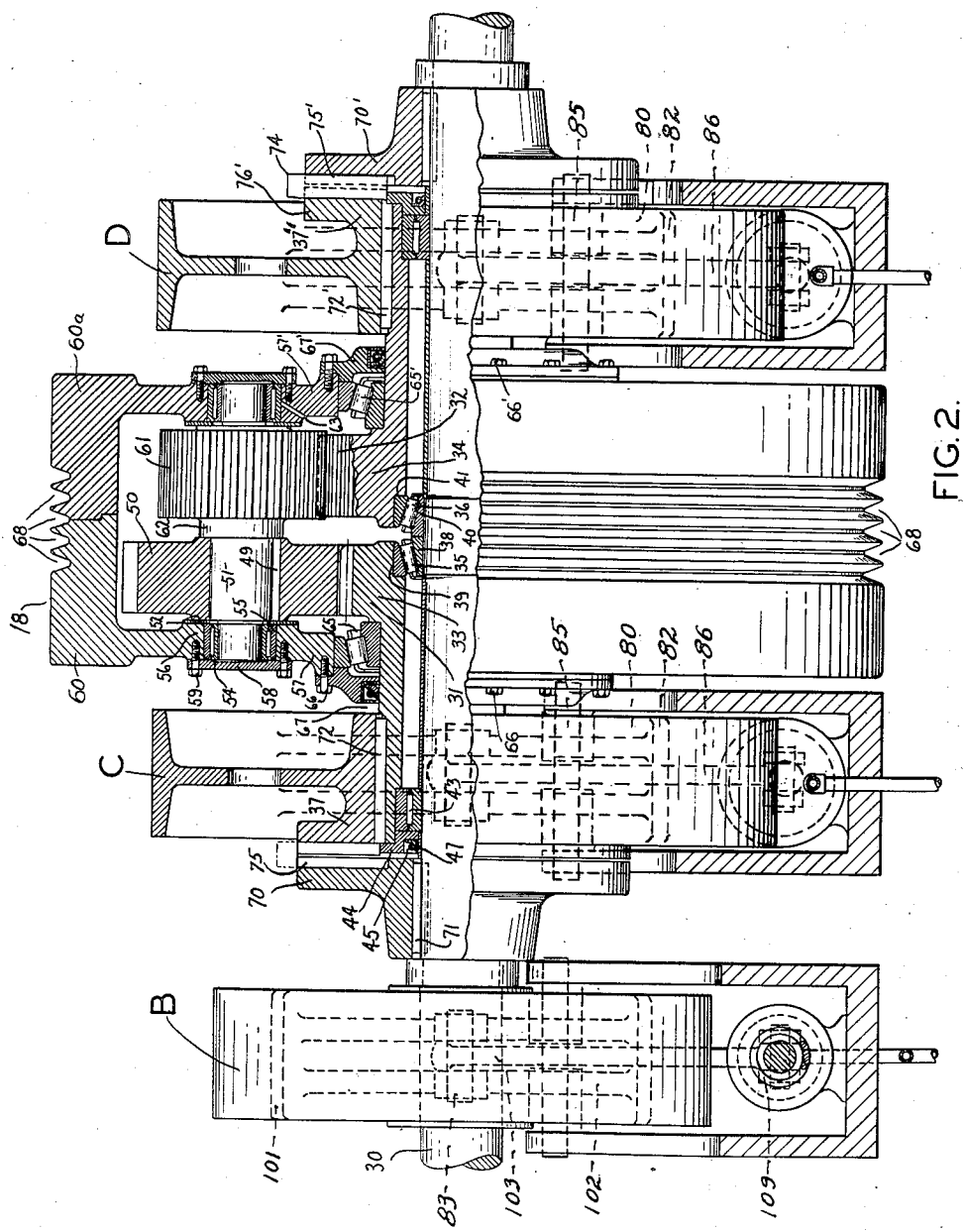

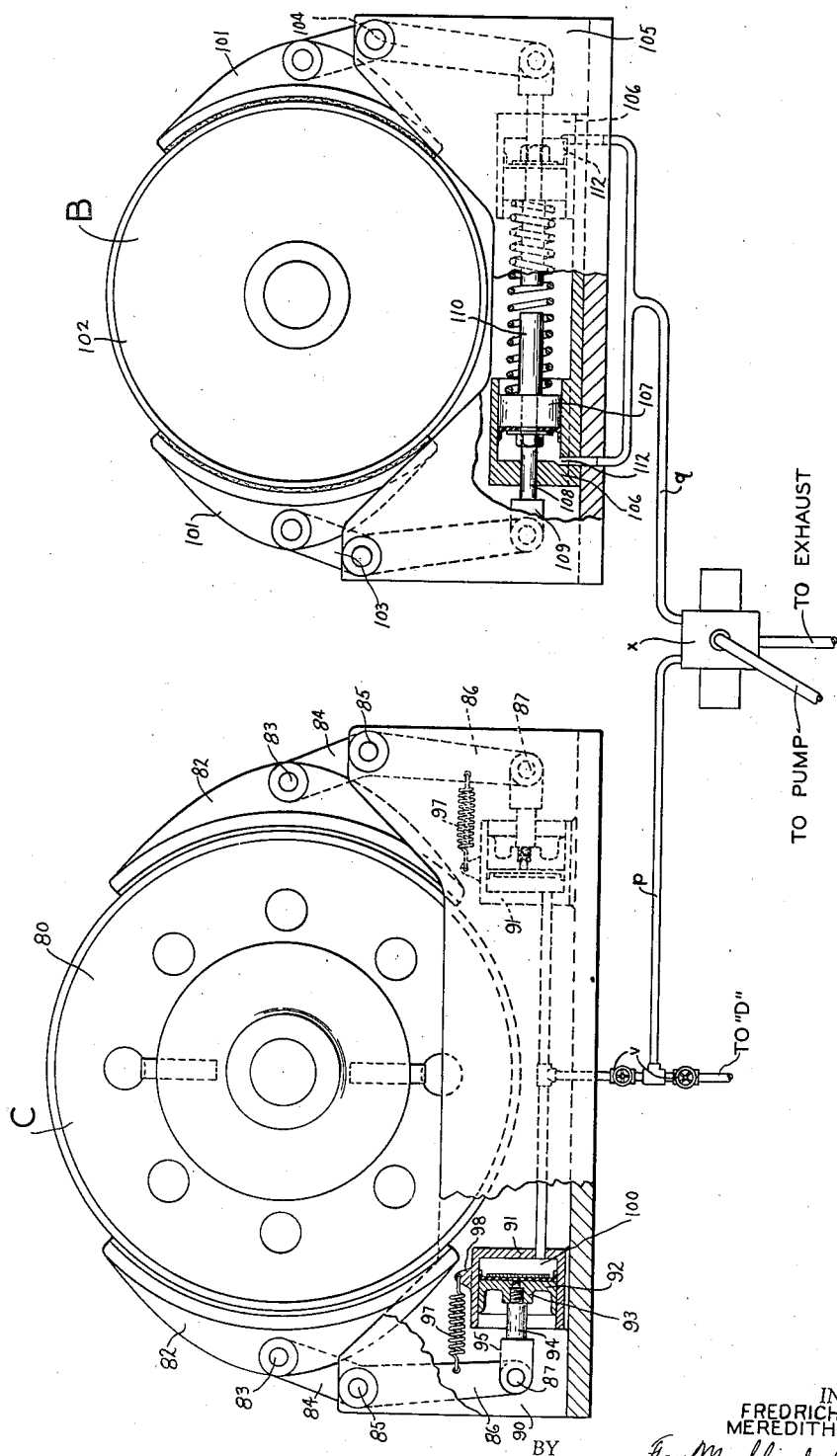

2,382,820

UNITED STATES PATENT OFFICE 2,382,820

SPEED VARYING GEAR MECHANISM

Fredrich J. Rode and Meredith R. Hatch, Toledo, Ohio, assignor to E. W. Bliss Company, Brooklyn, N. Y., a corporation of Delaware Application March 24, 1942, Serial No. 436,002

6 Claims. (Cl. 74—290)

The present invention relates to a speed varying mechanism of the type designed to control the speed of the main driven shaft of a machine by means of a compound differential gear.

In some types of machines, for instance for heavy thread cutting operations, it is necessary to reduce the normal speed of the shaft to provide a slow and powerful movement. Similar change of speed may be required for other heavy work, as in power presses and the like. As another case, where a different ratio of speed may be necessary, we name slow starting machines, for instance those of the textile industries.

The speed changing devices associated with the above mentioned and similar machines usually consist of different combinations of gearing. When it is intended to have the reducing unit confined within comparatively small space, it is advantageous to use compound differential gear mechanism and it is with a construction of this type the present invention is particularly concerned.

According to this invention the speed varying mechanism comprises two systems of planetary gears arranged on a common shaft in different vertical planes, the planet pinions of one system being of different diameter from the planet pinions of the other system and their orbits being likewise at variance. For controlling the speed, a brake and clutch system is provided which comprises several clutch members and several brakes to control each of the planetary systems. Further details of construction will appear in the following specification.

In the following specification and the accompanying drawings the speed varying mechanism is described in connection with a power press, but it should be understood that our invention is applicable for the purpose as explained above in machinery of other types as well.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various means in which the principle of the invention may be used.

In said annexed drawings:

Fig. 2 shows such mechanism partly in elevation and partly in section on line 2—2 of Fig. 1; and Fig. 3 illustrates in elevation a part of the clutch and brake construction for controlling the speed varying mechanism.

Figure 1:
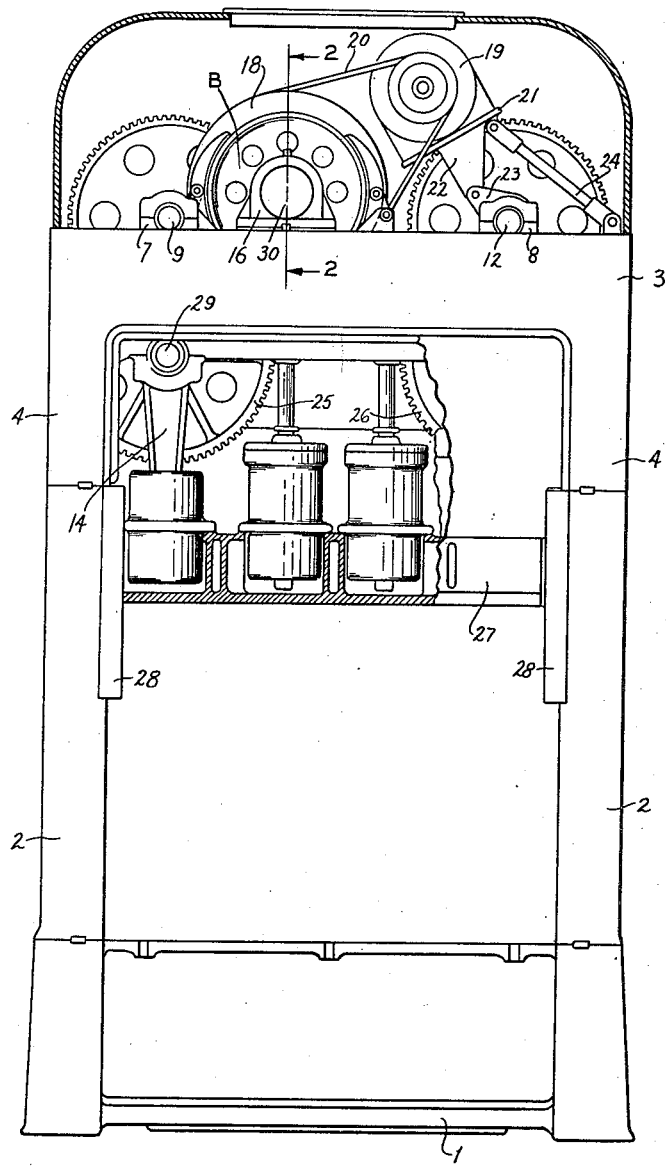
Fig. 1 is a power press having the speed varying mechanism according to the invention embodied therein.

Referring more particularly to Fig. 1 of the drawings, the press will be seen to comprise a bed 1, spaced uprights 2 mounted on the bed, and a crown 3 having spaced depending side portions 4 mounted on the uprights 2. The bed, uprights, and crown are adapted to be rigidly but removably secured together by means of vertically extending tie rods and nuts (not shown).

Mounted in the crown is a pair of longitudinally spaced bearings 7 and 8, carrying shafts 9 and 12 respectively, each having keyed thereto a pinion (not shown) for meshing with the gears 25, 26, which are the gears for driving the crankshafts that actuate the slide of the press. The gear train used for the transmission may be the one shown in our patent 2,284,303.

Intermediate the bearings 7 and 8, pedestal bearings 16 are mounted in which is journalled a drive shaft 30. A flywheel 18 is carried by shaft 30 being mounted thereon for independent rotation; the wheel is driven by an electric motor 19 through the intermediary of an endless belt 20, the motor being supported by a bracket 21 having depending legs 22 which are pivotally secured to arms 23 that extend from the crown. The tension of the belt 20 may be adjusted by moving the motor 19 about its pivotal mounting, and for this purpose, a turnbuckle 24 is provided which is at one end pivotally connected to the crown and at the other end to the bracket 21.

Housed within flywheel 18 are the planetary gear systems with which the present invention is mainly concerned; they are best shown in Fig. 2 and will presently be described.

In order to start and stop the press, a compound clutch and brake unit is provided on the shaft 30, which cooperates with the planetary gears as explained below.

Referring to Fig. 2, the main drive shaft 30 is shown to carry the brake B and two gears 31 and 32, which are the center or sun gears of two planetary systems. These gears have the shape of sleeves with flanged portions 33 and 34. These latter portions are carried by roller bearings comprising rollers 35 and 36 mounted between races 38, 39 and 40, 41 respectively. The outer end of gear sleeve 31 is supported by a needle bearing 43 which is held in place by a retaining ring 44, having a recess 45 formed therein for housing a grease seal 47.

The inner end portion 33 of gear sleeve 31 is the gear proper which engages with a number of cluster gears, usually three in number, one of which is shown in Fig. 2 and designated by numeral 50. The cluster gear is mounted for rotation on a shaft 51 to which it is keyed as at 49, and has a hub abutting on a bushing 52 which separates it from a flanged portion 56 of the flywheel. A cluster gear 61 which is smaller in diameter than gear 50, is keyed to shaft 51 and is separated from gear 50 by a hub 62 formed on gear 61. It is to be understood that there are as many gears 61 as there are gears 50 and that gears 61 mesh with the sun gear 33.

The shaft 51 is carried by needle bearings 54 whose outer races 55 are received between flanged portions 56 and 57 of the flywheel and whose side faces are held by a cap 58 secured to flanges 56 and 57 by bolts 59.

The flywheel 18, which is conveniently made in two parts, 60 and 60ᵃ, to allow of ready assembly of the drive mechanism, is supported by roller bearings 65, 65' of similar construction to bearing 35, retaining members 67, 67' being provided which serve for receiving a grease seal on the one hand, and for holding flanges 57, 57' against lateral displacement on the other hand, the bolts 66, 66' holding the pieces together. Grooves 68 in the circumference of the flywheel serve for receiving V belts for connecting the wheel to the motor 19.

Since the construction, which has so far been described for the drive mechanism shown on the left-hand side of Fig. 2, is exactly the same on the right-hand side, except for the difference in diameter of the sun and planetary gears, a description of this part of the mechanism is dispensable.

The connection between the main driven shaft 30 and the sun gear 31 of one of the planetary gear systems is made by means of a hub 70 secured to the shaft 30 as at 71, and the hub 37 of the wheel of brake C on one side, while similar means are provided on the other side of the mechanism for connecting sun gear 32, said means comprising a hub 70' keyed to shaft 30 and hub 37' of the wheel of brake D. The wheels of brake C and D are keyed with their hubs 37 and 37' to the end portions of sleeves 31 and 32, respectively, as at 72 and 72'. To make the connection effective a key 74 is provided which snugly fits into the free space 75' between the hub 70' and a flange 76' formed on hub 37'. A similar space for receiving key 74 is provided between hubs 70 and 37 at the other side of the mechanism. In Fig. 2 brake D is shown in operative connection with driven shaft 30, while brake C is disconnected.

As shown in Fig. 3, the brake C comprises a circular disk 80 from which holes are cut out as usual in castings of this kind. The disk 80 is arranged between two shoes 82 which are shaped to follow the circular contour of the disk and to engage therewith when a driving connection is not desired. The shoes are mounted so as to be rocked into and out of engagement on pins 83 which also carry one end 84 of a bell crank lever journalled at 85, having its other end 86 pivoted to a pin 87 which is attached to a frame 90.

Likewise mounted on frame 90 on each side of the brake is a cylinder 91 in which a piston 92 is received for reciprocatory movement. The piston head 93 carries a rod 94 which is fastened to a connecting member 95 connecting the piston with the lower end of bell crank arm 86. Intermediate between the two pivot points said arm 86 is connected to one end of a spring 97, the other end of which is carried by a projection 98 on cylinder 91. Springs 97 on either side of the brake normally pull the associated bell crank levers back and thus hold the shoes 82 out of engagement with the disk 80. In order to move the shoes into engagement with the brake disk a fluid under pressure is admitted into cylinder 91 at 100, which presses against a piston head 93 and moves the rod 94, connecting member 95 and crank arm 86 to the left, thereby pushing arm 84 to the right and shoe 82 into engagement with disk 80.

Brake D is a complete duplicate of brake C and hence is not further described.

The construction of brake B is quite similar to the one of C and D. It comprises a disk 102, brake shoes 101 mounted for engagement therewith, two bell crank levers 103 and 104 being provided, mounted on a frame 105. On each side of the brake a cylinder 106 is provided, having a piston 107 accommodated therein which is connected by a rod 108 and connecting member 109 to the bell crank levers 103 and 104, respectively. The only difference between the construction of brake B as compared to C and D consists in the application of a heavy spring 110 in brake B, which normally acts on the pistons so as to push them apart, thereby forcing the brake shoes 101 into engagement with the disk 102. Fluid is in this case admitted at ports 112, moving the pistons toward each other and pulling the shoes 101 back from disk 102. Consequently, while the brakes C and D are operated by application of pressure, brake B is released when pressure is applied.

The pipe for connecting the brakes C and D with the fluid operated system is designated by $p$. Two-way valves $v$ alternately connect line $p$ to brake C or to brake D. On the other side line $p$ is connected to a four-way valve $x$, from which one pipe, $q$, leads to brake B, another one to a reservoir and still another to the exhaust line.

As mentioned above, the main shaft 30 is connected by means of a gear train, partly shown in Fig. 1, to gears 25 and 26 which serve for operating crankshafts 29 that in turn are reciprocating the slide 27 of the press. Fig. 1 shows a connection 14 pivotally connected to the crank pin and with its lower end hinged to some connection (not shown) which leads to the die slide 27 of the press mounted for reciprocatory movement between ways 28 which are secured to the uprights 2 of the press.

The operation of the machine is as follows:

As soon as the motor 19 is started, flywheel 18 is driven through belting 20, taking along the cluster gears of both planetary systems mounted in the flywheel. At the same time the cluster gears meshing with their respective sun gears will cause the latter to rotate idly on their bearings 35, 43 and 36, 43', respectively. To bring about a driving connection between one of the planetary gear systems and the machine shaft 30, one of the brakes C and D has to be connected by means of key 74 and hubs 70 or 70' to said machine shaft. As mentioned before, in the drawings the driving connection is shown effective between gear system 61, 34, brake D and hub 70'. At the same time brake C has to be held against rotation. To bring this about fluid under pressure is admitted into the cylinder for actuating the brake shoes 82 to engage with disk 80, while the brake B is released by applying fluid through parts 112.

If it is intended to change the speed by switching over to the other planetary gear system, key 74 has to be removed from recess 75' and to be placed into 75 whereby brake D is disconnected and brake C connected to the driven shaft 30. The position of valves v has to be changed to make fluid enter the system of brake D, brake B remaining in the position as described above. In case the machine is to be stopped, both brakes C and D are disconnected and fluid withdrawn from line 9, whereupon spring 110 becomes effective to push shoes 101 into engagement with disk 102.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. Speed varying mechanism comprising a flywheel, two sets of cluster gears mounted therein for rotation with said flywheel, one set differing from the other in size, said cluster gears being adapted alternatively to drive a machine shaft, two sun gears, one of said sun gears mounted for engagement with each of said cluster gears, combined thrust and roller bearings mounted on said machine shaft for carrying said sun gears, two clutch members, one secured to each sun gear, to connect or disconnect said gear with said machine shaft, two hubs rigidly fastened on said shaft and a removable member, both said hubs and the removable member cooperating alternatively with one of said clutch members in connecting one of said gears with said machine shaft and a brake mounted on said machine shaft for stopping the rotation of said shaft.

2. Speed varying mechanism comprising two systems of planetary gears mounted for selectively driving a machine shaft, common means adapted to drive said planetary gears, a plurality of coupling members mounted in pairs, each pair for cooperation with a sun gear of one of said planetary gear systems to connect or disconnect said sun gear with said machine shaft, one member of each pair being secured to one of said sun gears and the other member of the pair being secured to the machine shaft, an auxiliary member cooperating with the one pair of coupling members in connecting one of said sun gears with said machine shaft, means in each of said planetary gear systems for selectively holding the disconnected sun gear against rotation, and a brake mounted on said machine shaft for stopping the rotation of said shaft.

3. Speed varying mechanism comprising two planetary gears mounted for selectively driving a machine shaft, a fly wheel adapted to drive said planetary gears, a plurality of coupling members mounted in pairs, each pair for cooperation with one of said planetary gears to connect or disconnect said gear with said machine shaft, one member of each pair consisting in a hub secured to one of said planetary gears and the other member of the pair consisting in a hub being secured to the machine shaft, an auxiliary member cooperating with the one pair of hubs in connecting one of said gears with said machine shaft, brake means on each of said planetary gears for selectively holding the disconnected gear against rotation, and a brake mounted on said machine shaft for stopping the rotation of said shaft.

4. Speed varying mechanism comprising two systems of planetary gears mounted for selectively driving a machine shaft, common means adapted to drive said planetary gears, a plurality of coupling members mounted in pairs, each pair for cooperation with a sun gear of one of said planetary gear systems to connect or disconnect said sun gear with said machine shaft, means to secure one member of each pair to one of said sun gears and the other member of the pair to the machine shaft, an auxiliary member cooperating with the one pair of coupling members in connecting one of said sun gears with said machine shaft, said auxiliary member being arranged in a plane at right angles to said means for securing said coupling members to said sun gears, means in each of said planetary gear systems for selectively holding the disconnected sun gear against rotation, and a brake mounted on said machine shaft for stopping the rotation of said shaft.

5. Speed varying mechanism comprising a flywheel, two sets of cluster gears mounted therein for rotation with said flywheel, said cluster gears being adapted selectively to drive a machine shaft, two sun gears, one of said sun gears mounted for engagement with each of said cluster gears, combined thrust and roller bearings mounted on said machine shaft for carrying said sun gears, two pairs of clutch members, one member of each pair being secured to each sun gear, and the other member of each pair being secured to said machine shaft, a removable auxiliary member cooperating with the one of said pair of clutch members in connecting said gear to the machine shaft, and brake means on each of said sun gears for holding the disconnected sun gear against rotation.

6. A speed varying mechanism comprising a flywheel, two sets of cluster gears mounted therein for rotation with said flywheel, said cluster gears being adapted selectively to drive a shaft, two sun gears, one of said gears mounted for engagement with each of said cluster gears, combined thrust and roller bearings mounted on said shaft for carrying said sun gears, two combined clutch and brake wheels, one secured to each sun gear to connect and disconnect said gear with said shaft, two hubs rigidly fastened on said shaft, a removable member, both said hubs and the removable member cooperating alternatively with one of said wheels in connecting one of said gears with said shaft while said other wheel is braked against rotation, and a brake mounted on said shaft for stopping the rotation of said shaft.

FREDRICH J. RODE.
MEREDITH R. HATCH.